United States Patent [19]
Dionne et al.

[11] Patent Number: 5,486,027
[45] Date of Patent: Jan. 23, 1996

[54] COMBINED TRACTION MAT, SHOVEL AND UTILITY DEVICE

[76] Inventors: Alain Dionne, 1988 DeVilliers; Benoit Corbeil, 2026 DeVilliers, both of Montreal, Canada, H4E-1L3

[21] Appl. No.: 278,321

[22] Filed: Jul. 21, 1994

[51] Int. Cl.[6] .................................. A01B 1/20; E01H 5/02
[52] U.S. Cl. .................................. 294/51; 7/116; 238/14;
294/54.5; 294/57
[58] Field of Search ................................ 294/49, 51, 54.5,
294/55, 57–59; 7/100, 114–116, 169, 170;
15/236.02, 257.2; 37/264, 265, 285, 241;
238/14

[56] References Cited

U.S. PATENT DOCUMENTS

| | | | |
|---|---|---|---|
| 1,061,980 | 5/1913 | Cahn | 294/51 X |
| 1,207,472 | 12/1916 | Barton | 294/57 X |
| 1,218,767 | 3/1917 | Heginbottom | 294/51 X |
| 1,339,612 | 5/1920 | Wilkins | 294/51 X |
| 1,401,689 | 12/1921 | Gentry | 238/14 |
| 3,014,750 | 12/1961 | Briggs | 294/58 |
| 4,993,768 | 2/1991 | Ewen | 294/51 |

FOREIGN PATENT DOCUMENTS 2087320  5/1982  United Kingdom .................... 238/14

*Primary Examiner*—Johnny D. Cherry

[57] ABSTRACT

A combined traction mat, shovel and utility device which is adapted to be stored inside a vehicle and to be used in a variety of vehicle related emergency situations. The device has a substantially flat and elongated body. The body is divided into a first gripping section located at the rearward end of the body, a second gripping section located at the frontal end of the body and an intermediate section located between the first gripping section and the second gripping section. A corrugated pattern is formed on the top and bottom surfaces of the first and second gripping sections. A central open-top channel extends longitudinally across the body of the device. A handle is formed in the first gripping section by an aperture extending therethrough. The intermediate section forms a relatively elongated and short shaft which can also be used as a handle. The second gripping section can be ergonomically used as a shovel scoop by a user holding on to the handle formed in the first gripping section with one hand and holding on to the intermediate section with the other hand. The device can also be used as a standard traction mat since both the first and second gripping sections have corrugated surfaces. The device can also be used as an emergency warning sign for warning oncoming vehicles of the presence of a disabled vehicle. The device used as an emergency warning sign can either be implanted into a volume of loose material or a pair of devices can be used with one device acting as a supporting base for the other. The corrugated patterns on both surfaces are complementary, minimizing the storage space for a pair of devices.

9 Claims, 7 Drawing Sheets

COMBINED TRACTION MAT, SHOVEL AND UTILITY DEVICE

FIELD OF THE INVENTION

The present invention relates to the field of vehicle accessories and is particularly concerned with a combined traction mat, shovel and utility device which is adapted to be stored inside a vehicle and to be used in a variety of vehicle related emergency situations.

BACKGROUND OF THE INVENTION

Vehicles which are driven in snowy conditions are subject to getting stuck in deep snow or on a particularly slippery road patch. When such a situation occurs, portable traction devices, often referred to as traction mats, are used to temporarily improve the friction coefficient between the road and the wheels of the vehicle.

The art of traction devices is replete with conventional traction mats of various shapes and sizes. Most of these traction mats have a substantially flat and elongated body defining a pair of traction surfaces. These conventional traction surfaces typically have a set of integrally and substantially perpendicularly projecting traction prongs defining a substantially corrugated-like pattern.

The conventional traction mats have a frontal edge which is adapted to be partially inserted between a slipping wheel of a vehicle and the corresponding slippery road patch so that when the wheel is rotated, it will engage the traction mat. Having engaged the traction mat, the wheel will roll on one of its corrugated surface while the other corrugated surface grips the slippery road patch, thus allowing the vehicle to get unstuck.

In order to be efficient, the conventional traction mats initially have to be properly wedged between the slipping wheel and the slippery road patch with the frontal edge of the traction mat squeezed between the relatively deformable tire and the road so that when the wheel is rotated, the friction between the tire and the mat will draw the latter under the wheel.

Since the mats are often used in snowy conditions, it is often necessary to remove some of the snow from the periphery of the wheel in order to allow proper initial insertion of the frontal edge of the traction mat underneath the wheel. Accordingly, users of such traction mats most often resort to shoveling some of the snow which surrounds the tire. Also, when particularly deep snow surrounds the vehicle, the user must shovel snow not only around the slipping wheel in order to allow insertion of the traction mat, but also in front or in back of the vehicle in order to create a path in which the vehicle will be able to move.

Users of conventional traction mats must therefore resort to carrying and handling along with the conventional traction mats a conventional snow shovel. The carrying and manipulation of two separate tools can prove to be both tedious and non-ergonomical, especially when the user is wearing mittens or gloves, which is often the case when ice or snowy conditions are encountered. Accordingly, there exists a need for a device which can be used alternatively both as a traction mat and as a shovel means.

A search amongst prior art documents has revealed one patent disclosing such a device. U.S. Pat. No. 4,993,768 granted to James Ewen, Feb. 19, 1991, and assigned to Ronald C. Lamparter, discloses a combined shovel and utility device that has an elongated body. A shovel scoop extends from one of the longitudinal ends of the body. A plurality of ridges extends integrally from the elongated body so that the device can be used alternatively as a shovel or as a traction mat.

However, the device disclosed is difficult to manipulate as a shovel.

SUMMARY OF THE INVENTION

Accordingly, it is an object of the present invention to provide an improved combined traction mat, shovel and utility device.

The combined traction mat, shovel and utility device in accordance with an embodiment of the present invention will be insertable between a slipping wheel of a vehicle and the road on which it is supposed to be rolling.

The combined traction mat, shovel and utility device in accordance with an embodiment of the present invention will also be adapted to be used as a shovel for shoveling material such as snow, sand or the like.

The combined traction mat, shovel and utility device in accordance with an embodiment of the present invention is further adapted to be used as a warning sign, which can be positioned adjacent a stalled vehicle in a substantially upright position so as to warn oncoming traffic of the presence of the stalled vehicle.

The combined traction mat, shovel and utility device in accordance with an embodiment of the present invention is adapted to be stackable with other similar combined traction mat, shovel and utility devices in accordance with an embodiment of the present invention in order to minimize the required storage space.

According to an embodiment of the present invention, there is provided a combined shovel-traction and utility device adapted to be manipulated by a first hand and a second hand of a user, the combined shovel-traction and utility device comprising: a substantially flat and elongated body, the body having a top surface and a bottom surface, the body having a first gripping section, a second gripping section, an intermediate section located between the first gripping section and the second gripping section, a corrugated pattern formed on the top surface of the first gripping section and the second gripping section of the body, a first handle means for allowing the first hand of the user to grasp the first gripping section, the first handle means being formed in the first gripping section, a second handle means for allowing the second hand of the user to grasp the intermediate section, the second handle means being formed by the intermediate section.

Preferably, the intermediate section is relatively narrower than the first gripping section and the second gripping section, the intermediate section having a substantially elongated configuration, the intermediate section being sized in order to allow the second hand of the user to grasp the intermediate section, whereby the intermediate section is adapted to be used as the second handle means.

Conveniently, the body has a longitudinal axis dividing the body into a pair of symmetrical half sections and wherein the body further comprises a substantially elongated longitudinal channel, the channel extending substantially collinearly with the longitudinal axis, from the first gripping section across the intermediate section and into the second gripping section, the channel having a substantially "U"-shaped cross-section defining a channel bottom wall and a pair of integrally and substantially perpendicularly extending channel side walls.

Preferably, the body further comprises a corrugated pattern formed on the bottom surface of the first gripping section and the second gripping section of the body.

Conveniently, the corrugated pattern formed on the top surface of the first gripping section and the second gripping section of the body is substantially complementary to the corrugated pattern formed on the bottom surface of the first gripping section and the second gripping section of the body whereby, when the top surface of the device is put in an abutting relationship with a bottom surface of a similar second combined shovel-traction and utility device, the corrugated pattern formed on the bottom surface of the first gripping section and the second gripping section of the body of the second similar device fits into the corrugated pattern formed on top surface of the first gripping section and the second gripping section of the combined shovel-traction and utility device.

Preferably, the second gripping means has a second gripping means front end and a second gripping means rear end, the second gripping means also having a pair of second gripping means longitudinal side walls and a second gripping means rear wall, the second gripping means rear wall being positioned at the rear end of the second gripping means, the second gripping means rear wall being substantially perpendicular to the second gripping means side walls, the second gripping means rear wall extending integrally and substantially perpendicularly into the intermediate section.

Conveniently, the second gripping means has a substantially flat plate projecting integrally and substantially frontwardly from the second gripping means front end.

Preferably, the first gripping means has a first gripping means rear end. The first handle means comprises a handle aperture extending through the first gripping means and a handle rear wall positioned adjacent the handle aperture, the handle aperture and the handle rear wall being positioned adjacent the first gripping means rear end.

Conveniently, the body further comprises a set of adjacent oblique gripping walls. The corrugated pattern formed on the top surface comprises a set of top surface angled gripping edges and the corrugated pattern formed on the bottom surface comprises a set of bottom surface angled gripping edges, the top surface gripping edges and the bottom surface gripping edges being formed by the intercepting edges of the adjacent angled gripping walls.

Preferably, the device is adapted to be used as a traction mat for a wheel of a conventional vehicle. The first gripping section and the second gripping section have a width corresponding substantially to the width of the tire of the conventional vehicle and the intermediate section has a width allowing the second hand of the user to grasp the intermediate section.

According to an embodiment of the present invention, there is provided a combined shovel-traction and utility device, the device comprising: a substantially flat and elongated body, the body having a top surface and a bottom surface, the body having, a first gripping section, a second gripping section, an intermediate section located between the first gripping section and the second gripping section, the first gripping section and the second gripping section both having a pair of opposed top and bottom surfaces, each one of the top and bottom surfaces bearing a substantially corrugated pattern, an elongated, open-top, substantially "U"-shaped central channel extends from the first gripping section across the intermediate section, into the second gripping section, the central channel has a central channel bottom wall, a pair of central channel longitudinal walls extending integrally and substantially upwardly from the central channel bottom wall and a pair of central channel transversal walls joining the central channel longitudinal walls at the frontal and rear end of the central channel, a pair of peripheral outer side walls extends along both longitudinal sides of the body, the peripheral outer side walls project substantially perpendicularly to the top and bottom surfaces, an intermediate section segment of the outer side walls extends integrally into a pair of intermediate section top walls, each intermediate section top wall merges into an upper edge of the central channel longitudinal side walls, the intermediate section having a substantially elongated configuration.

BRIEF DESCRIPTION OF THE DRAWINGS

An embodiment of the invention will now be described, by way of example, in reference to the following drawings in which.

DETAILED DESCRIPTION

Figure 3:
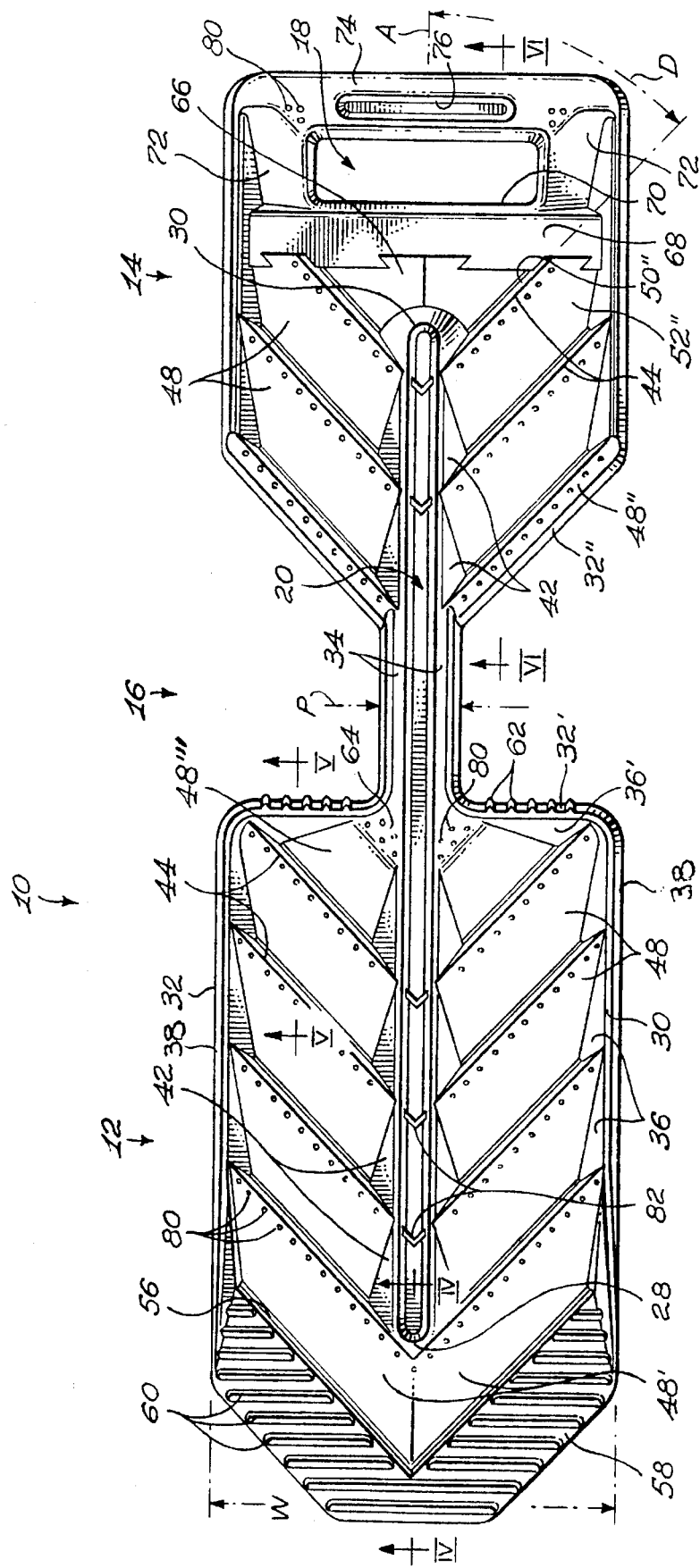
FIG. 3: in a top view, illustrates a combined traction-shovel and utility device in accordance with an embodiment of the present invention.

Referring to FIG. 3, there is shown a top view of a combined traction-shovel and utility device 10 in accordance with an embodiment of the present invention. The device 10 has a generally elongated and flat body. The body of the device 10 is divided into a frontal section 12, a rear section 14, and a substantially narrower intermediate section 16. The intermediate section 16 is positioned in an intermediate position between the frontal section 12 and the rear section 14.

Figure 9:
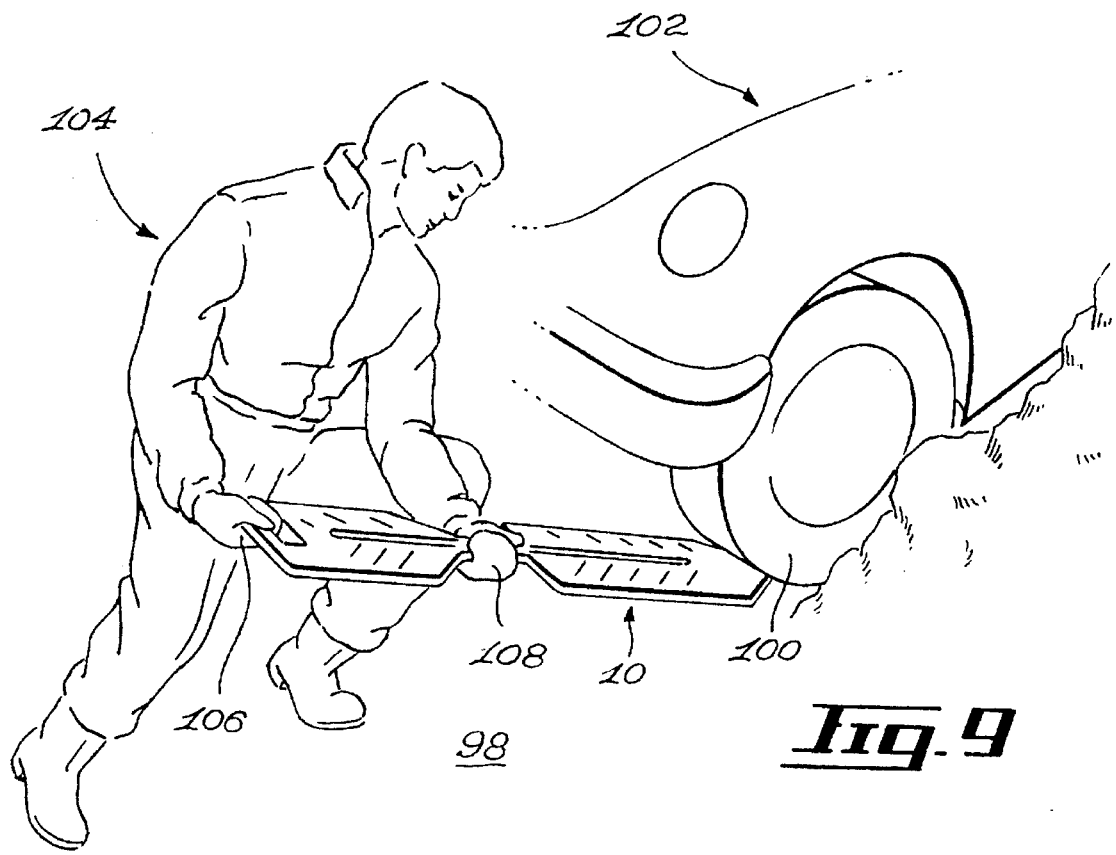
FIG. 9: in a schematic perspective view, illustrates a combined traction-shovel and utility device in accordance with an embodiment of the present invention with its frontal edge being inserted underneath the wheel of a vehicle by a user employing both hands.

The frontal section 12 and the rear section 14 both have a width indicated by the reference letter W which corresponds substantially to the width of a large conventional vehicle tire. The intermediate section 16 has a width indicated by the reference letter P which allows it to be ergonomically grasped by a human hand, as illustrated in FIG. 9.

Figure 1:
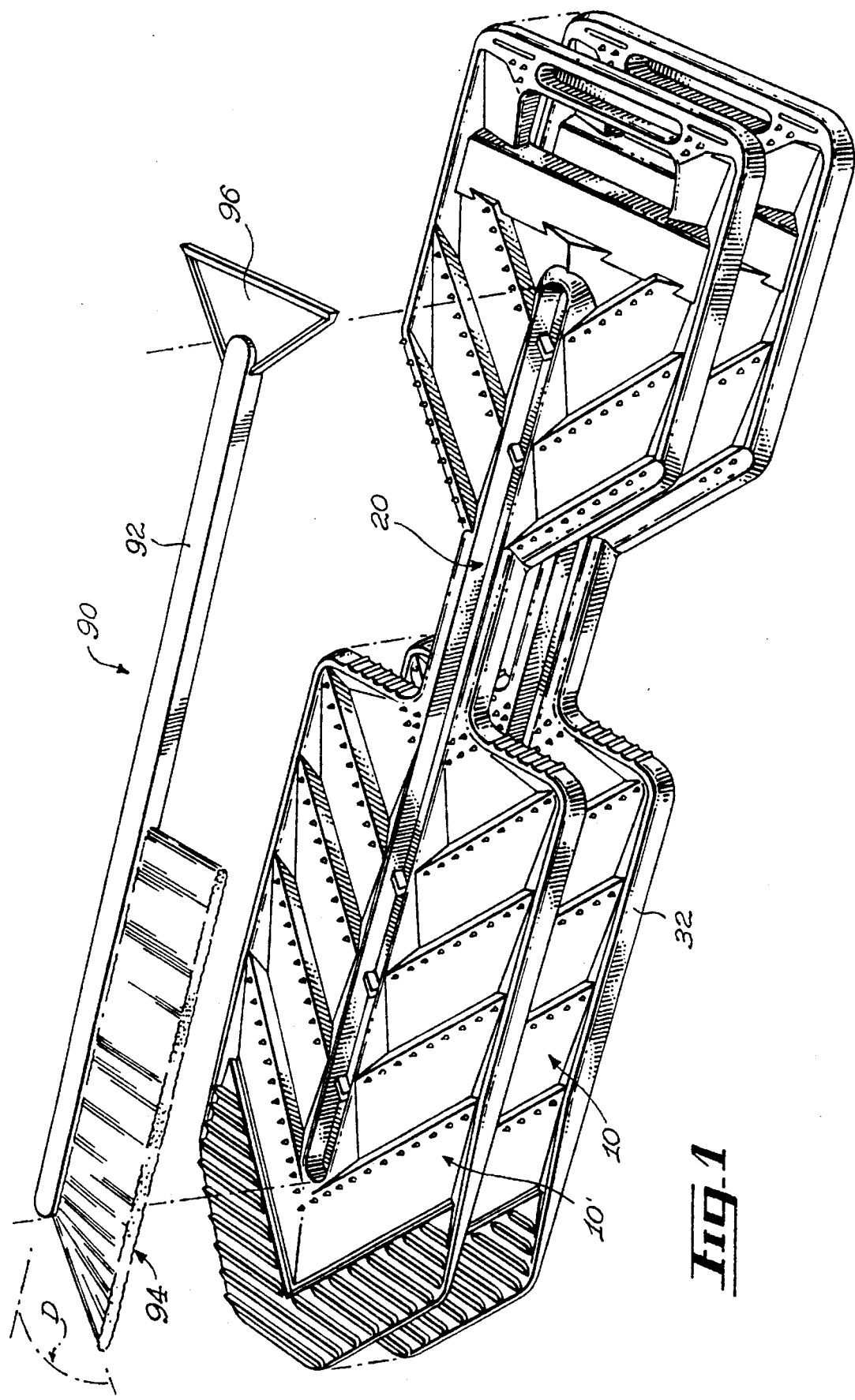
FIG. 1: in a top perspective view, illustrates a combined traction-shovel and utility device in accordance with an embodiment of the present invention, about to be stacked on top of a similar device and about to receive a snow brush.
Figure 4:
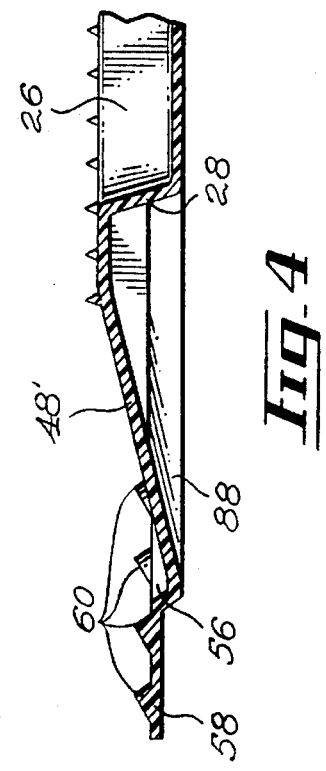
FIG. 4: in a partial longitudinal cross-sectional view taken along arrows IV—IV of FIG. 3, illustrates the configuration of the frontal edge of the frontal section part of a combined traction-shovel and utility device in accordance with an embodiment of the present invention.

Both the frontal section 12 and the rear section 14 have a pair of opposed, top and bottom, traction surfaces bearing corrugated patterns. As illustrated in FIGS. 1 and 4, the top surface of the frontal section 12 tapers downwardly at its frontal end. The rear section 14 has a substantially rectangular-shaped and generally transversely oriented handle aperture 18 extending therethrough, adjacent its rearward end.

An elongated, open-top, substantially "U"-shaped central channel 20 extends from the frontal section 12, across the intermediate section 16, into the rear section 14. The central channel 20 extends along a longitudinal axis indicated by the reference letter A. The longitudinal axis A separates the combined traction-shovel and utility device 10 into a pair of longitudinal symmetrical half sections.

Figure 8:
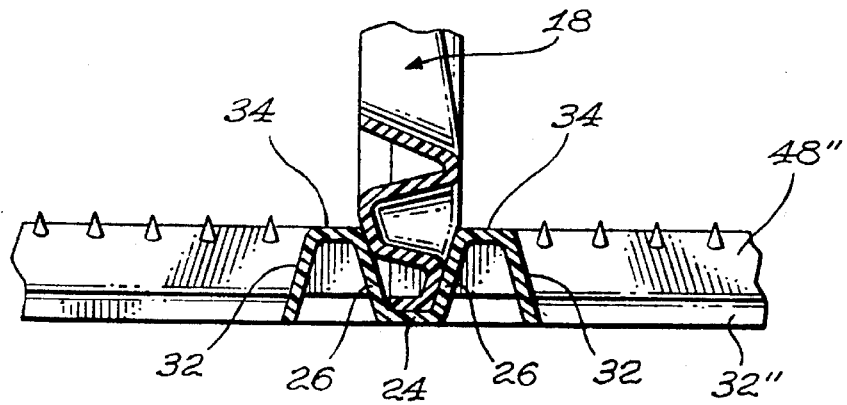
FIG. 8: in a transversal cross sectional view taken along arrows VIII—VIII of FIG. 7, illustrates the relationship between a pair of combined traction-shovel and utility devices in accordance with an embodiment of the present invention when one is being used as a base for supporting a second which is being used as a signaling device.

As illustrated more specifically in FIG. 8, the central channel 20 has a central channel bottom wall 24 and a pair of central channel longitudinal side walls 26 extending integrally and upwardly from the peripheral edges of the central channel bottom wall 24.

Figure 2:
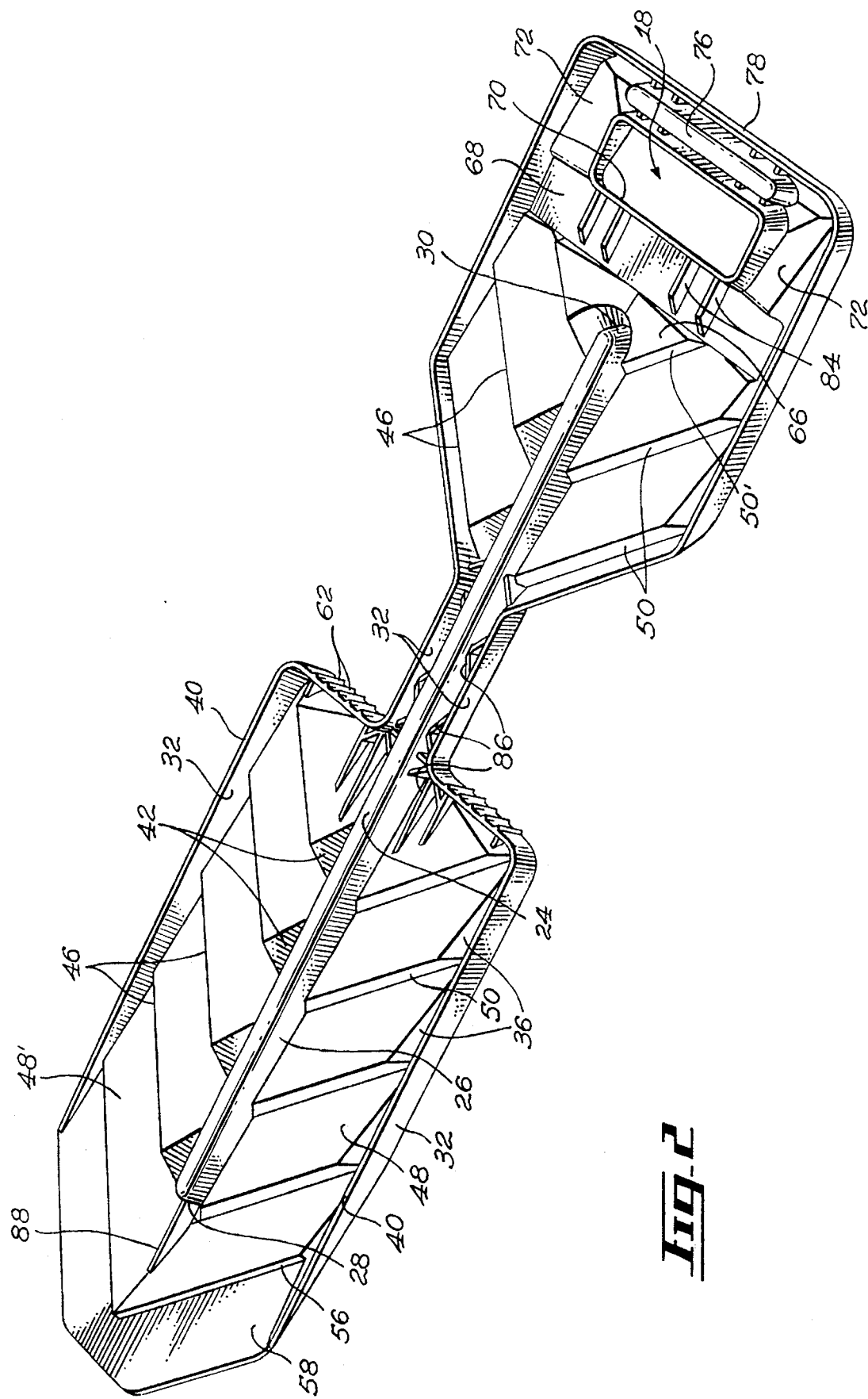
FIG. 2: in a bottom perspective view, illustrates a combined traction-shovel and utility device in accordance with an embodiment of the present invention.

As illustrated more specifically in FIGS. 2 and 3, the central channel 20 also has a pair of central channel transversal walls 28 and 30 closing off the central channel 20 at both ends by integrally joining the central channel longitudinal side walls 26, respectively, at the frontal end and the rearward end of the central channel 20.

A pair of peripheral outer side walls 32 extends along both longitudinal sides of the device 10. The outer side walls 32 project substantially perpendicularly to the top and bottom surfaces of the device 10.

As illustrated more specifically in FIG. 8, the intermediate section segments of the outer side walls 32 extend integrally at their upper edge into a corresponding pair of intermediate section top walls 34. Each intermediate section top wall 34 merges into an upper edge of the intermediate section segment of an adjacent central channel longitudinal side wall 26.

As illustrated more specifically in FIGS. 1, 2 and 3, the intermediate section segment of the central channel 20, the intermediate section segment of the outer side walls 32 and the intermediate section top walls 34 define a substantially elongated shaft adapted to act as a handle means. As stated previously, the width P of the intermediate section 16, which is delimited by the intermediate segment of the outer side walls 32, is sized in order to allow a human hand to ergonomically grasp the intermediate section 16. The length of the intermediate section 16 is also sized accordingly to allow manual prehension of the intermediate section 16, as illustrated in FIG. 9.

The segments of the outer side walls 32 in the frontal section 12 and the rear section 14 are bent integrally into a set of interrupted peripheral inner side walls 36. The inner side walls 36 extend inwardly and downwardly from the upper edge of the outer side walls 32 at approximately forty-five degrees relatively to the top surface of the device 10. The bending axis between the outer side walls 32 and the inner side walls 36 defines a top surface peripheral side edge 38, while the lower edge of the outer side wall 32 defines a bottom surface peripheral side edge 40.

The segments of the central channel side walls 26 in the frontal section 12 and the rear section 14 are bent integrally into a set of interrupted central channel delimiting walls 42. The central channel delimiting walls 42 extend downwardly and outwardly from the upper edge of the central channel side walls 26 at an angle of approximately forty-five degrees relatively to the top surface of the device 10.

A set of upper surface angled gripping edges 44 and a set of lower surface angled gripping edges 46 extend from the central channel delimiting walls 42 to the inner side walls 36 of both the frontal section 12 and the rear section 14. Each upper surface gripping edge 44 and each lower surface gripping edge 46 are formed by the intercepting edges of a corresponding set of adjacent oblique gripping walls 48 and 50 also extending between the central channel delimiting walls 42 and the inner side walls 36 of both the frontal section 12 and the rear section 14.

Each gripping wall 48 slopes downwardly towards the front of the device 10. The gripping walls 48 slope downwardly at an angle of approximately fifteen degrees relatively to the upper surface of the device 10, as indicated by the angle B in FIGS. 5 and 6.

Each gripping wall 50 slopes upwardly towards the front of the device 10. The gripping walls 50 slope upwardly at an angle of approximately seventy-five degrees relatively to the lower surface of the device 10, as indicated by the angle C in FIGS. 5 and 6. The gripping walls 48 and 50 are also inclined relatively to the longitudinal axis A by an angle of approximately forty-five degrees. The upper surface gripping edges 44 and the lower surface gripping edges 46 which are formed by the intercepting edges of a corresponding set of gripping walls 48 and 50 are both inclined by approximately forty-five degrees relatively to the longitudinal axis A, as indicated by the angle D in FIG. 3.

The upper surface gripping edges 44 extend from the upper edge of the central channel side walls 26 to the top surface peripheral side edge 38. The upper surface gripping edges 44, the upper edge of the central channel side walls 26 and the top surface peripheral side edge 38 all lie substantially in a same top plane. The lower surface gripping edges 46 extend from the inner side walls 36 to the central channel delimiting walls 42. The lower surface gripping edges 46 and the bottom surface peripheral side edges 40 all lie substantially in a same bottom plane.

The upper surface and lower surface gripping edges 44 and 46 and the gripping walls 48 and 50 all cooperate to define a longitudinally symmetrical and substantially "V"-shaped corrugated pattern on both the upper surface and the lower surface of the front section 12 and the rear section 14 of the device 10.

Figure 5:
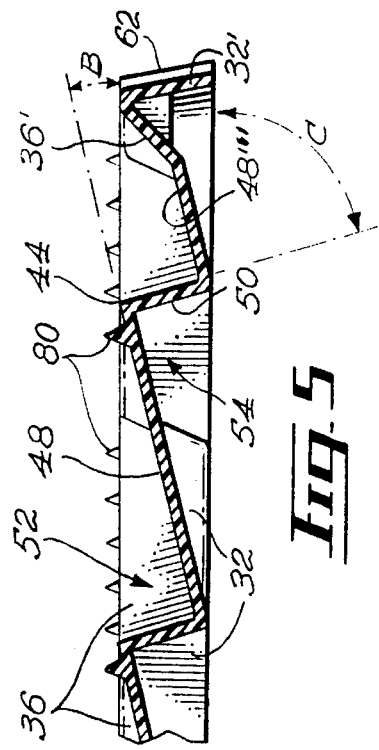
FIG. 5: in a partial longitudinal cross-sectional view taken along arrows V—V of FIG. 3, illustrates the configuration of the rearward end of the frontal section part of a combined traction-shovel and utility device in accordance with an embodiment of the present invention.
Figure 6:
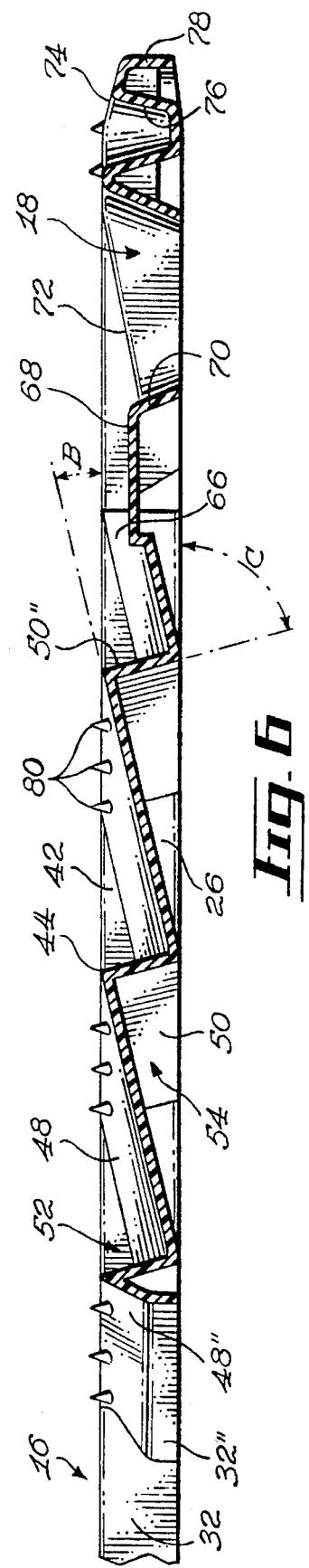
FIG. 6: in a longitudinal cross-sectional view taken along arrows VI—VI of FIG. 3, illustrates the configuration of the rear section of a combined traction-shovel and utility device in accordance with an embodiment of the present invention.
Figure 7:
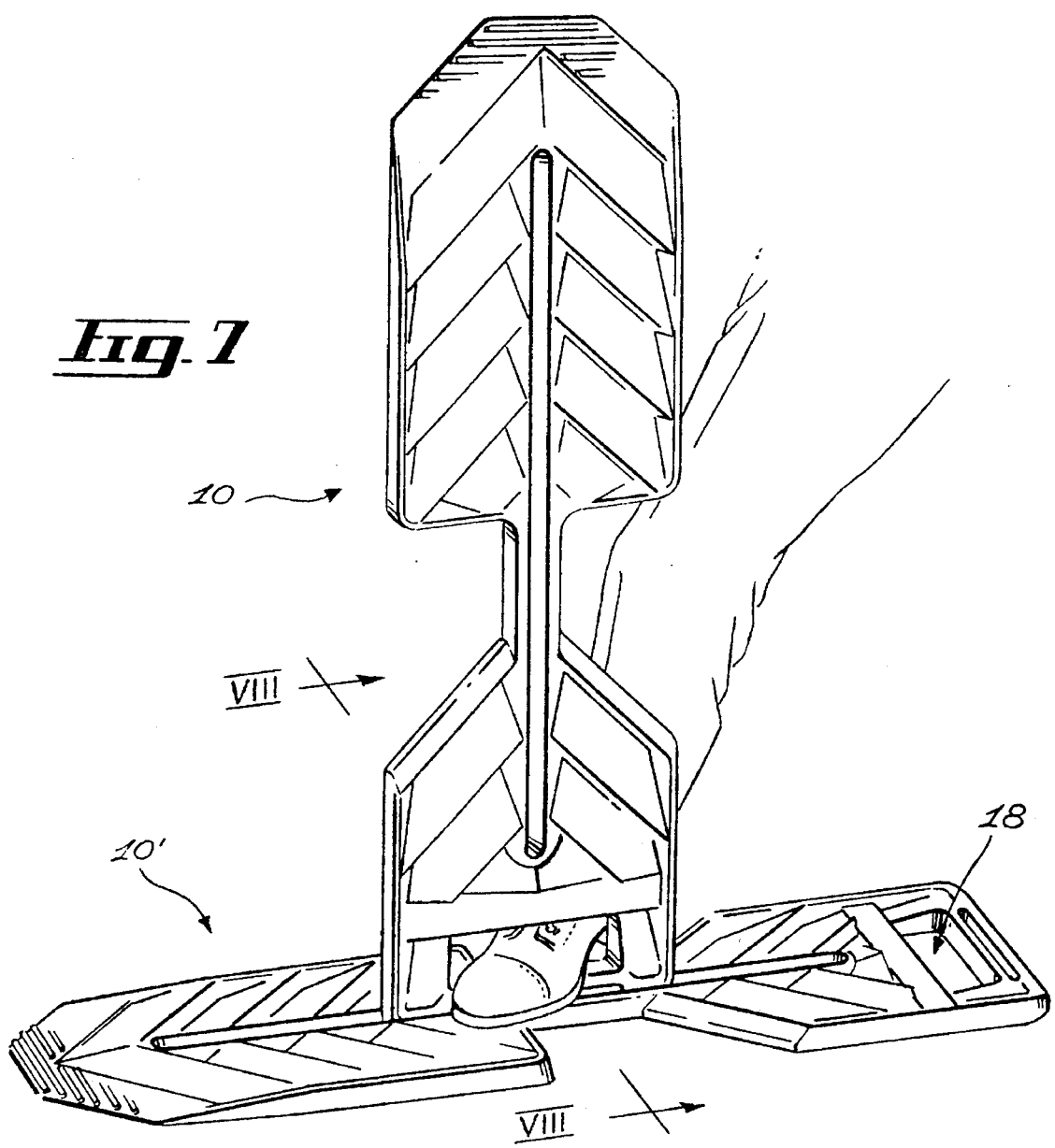
FIG. 7: in a perspective view, illustrates a pair of combined traction-shovel and utility device in accordance with an embodiment of the present invention, one of the combined traction-shovel and utility devices in accordance with an embodiment of the present invention being used as a signaling device while the other one acts as a stabilizing base.

As illustrated more specifically in FIGS. 5 and 6, the corrugated pattern on the upper surface of the device 10 defines a set of adjacent top surface recesses 52 on each side of the central channel 20. The adjacent top surface recesses 52 are separated from each other by corresponding upper surface gripping edges 44. The corrugated pattern on the bottom surface of the device 10 defines a set of adjacent bottom surface recesses 54 on each side of the central channel 20. The adjacent bottom surface recesses 54 are separated from each other by corresponding bottom surface gripping edges 46.

As illustrated more specifically in FIGS. 3 and 4, the frontwardmost pair of gripping walls 48' extend integrally at their front end into an upwardly slanted and short connecting lip 56. The connecting lip 56, in turn, extends integrally into a substantially "V"-shaped and relatively thin, flat gripping plate 58. The outer side walls 32 merge integrally into the gripping plate 58 at their frontal end. The front end of the device 10 thus has a substantially thin and flat configuration. The gripping plate 58 is provided with a set of substantially transversal and elongated gripping protrusions 60 extending integrally from its upper surface.

At the rearward end on the frontal section 12, the outer side walls 32 bend integrally and substantially perpendicularly into a pair of inwardly oriented front section outer side wall rear segments 32'. The inner side walls 36 also bend integrally and substantially perpendicularly into a pair of inwardly oriented front section inner side wall rear segments 36'. The segments 32' and 36' merge integrally into, respectively, the intermediate section segments of the outer and inner side walls 32 and 36. The segments 32' and 36' are substantially perpendicular to both the front section segments and the intermediate section segments of the outer and inner side walls 32 and 36. A set of relatively elongated rear segment gripping prongs 62 extends integrally from the segments 32'.

At the rearward end of the frontal section 12, each intermediate section top wall 34 merges into a substantially triangular-shaped, front section, transitional top wall 64. Each transitional top wall 64, in turn, merges into the rearwardmost gripping walls 48''' of the frontal section 12.

The gripping walls 48'' of the rear section 14 are intercepted integrally by a corresponding pair of angled, rear section outer side wall, front segments 32''. The pair of angled, rear section outer side wall, front segments 32'' are angled relatively to the longitudinal axis A by an angle of approximately forty-five degrees.

The central channel transversal wall 30 and the rearwardmost gripping walls 50'' extend integrally into a substantially rectangular-shaped rear section, inclined, transitional wall 66. The substantially rectangular-shaped rear section, inclined, transitional wall 66 and the rearwardmost gripping walls 52'' of the rear section 14 extend integrally into a transversal, substantially rectangularly-shaped front handle wall 68.

The front handle wall 68 extends in a plane substantially parallel to the top surface of the device 10, from an inner side wall 36 on one side of the device 10 to an inner side wall 36 on the other side of the device 10. The front handle wall 68 extends integrally at the rear into a substantially rectangular rim handle 70 which surrounds the handle aperture 18. The rim handle 70 extends integrally on each lateral side into a pair of handle side inclined walls 72. The rim handle 70 extends integrally at the rear into a rear handle wall 74. A reinforcing cavity 76 is formed into the rear handle wall 74. A rear wall 78 extends integrally and substantially perpendicularly from the rear handle wall 74. The rear wall 78 merges integrally on each side with the outer side walls 32.

A set of substantially conically-shaped gripping protrusions 80 extends integrally from the upper surface of various segments of the device 10. Some of the gripping protrusions 80 extend integrally from the gripping walls 48. These gripping protrusions 80 are substantially aligned adjacent the gripping edges 44 of the gripping walls 48. Other gripping protrusions 80 extend integrally from the upper surface of the frontal section 12, the transitional top wall 64 and the lateral portions of the rear handle wall 74.

A set of substantially "V"-shaped reinforcement ribs 82 is disposed inside the central channel 20. The reinforcement ribs 82 extend integrally from the upper surface of the central channel bottom wall 24 and the central channel longitudinal side walls 26.

As illustrated more specifically in FIG. 2, a set of substantially elongated reinforcement ribs 84 extends integrally from the lower surface of the front handle wall 68 and the lower surface of the front segment of the rim handle 70. A set of intermediate section reinforcement ribs 86 extends integrally from the lower surface of the intermediate section top walls, and the lower surface of the intermediate section segment of the outer side walls 32. Also, a front elongated reinforcement rib 88 extends integrally from the central channel transversal wall 28 and the lower surface of the frontwardmost gripping wall 48'.

The central channel 20 is adapted to act as a longitudinal structural reinforcement means. As illustrated more specifically in FIG. 1, the central channel 20 is also adapted to act as a releasable retaining means for a window wiping brush 90. The window wiping brush 90 has a wiping brush elongated handle 92. A set of bristles 94 is attached to a first end of the wiping brush handle 92. An ice scraping blade 96 is attached to a second end of the wiping brush handle 92.

The window wiping brush 90 is adapted to be releasably attached to a device 10 with the wiping brush handle 92 at least partially inserted into the central channel 20. The wiping brush handle 92 is dimensioned so as to be snappingly insertable into the central channel 20. The window wiping brush 90 is typically positioned so that the set of bristles 94 and the ice scraping blade 96 abuttingly rest against the top surface of the device 10. Preferably, the front end of the set of bristles 94 is angled relatively to the longitudinal axis of the wiping brush handle 92. The angle between the longitudinal axis of the wiping brush handle 92 and the front end of the set of bristles 94 is indicated by the reference letter D in FIG. 1.

In use, the combined traction-shovel and utility device 10 is adapted to serve in a variety of vehicle related emergencies. One of the functions which the device 10 can perform is that of a traction mat. As illustrated in FIG. 9, when the device 10 is used as a traction mat, a user 104 merely grasps the rear handle wall 74 and wedges the front edge of the flat gripping plate 58 between a slippery surface 98 and the tire 100 of the wheel which is slipping. Since the rear handle back 74 is positioned at the rear end of the device 10, the front edge of the flat gripping plate 58 can be introduced underneath the tire 100 without the need for the user to kneel down, as is often the case with conventional traction mats.

In certain instances, because of the specific nature, consistency or geometry of the surface 98 on which the tire 100 of the vehicle 102 is slipping, it is difficult to wedge the front edge of the flat gripping plate 58 between the tire 100 and the surface 98. In such instances, the user 104 has the option of using two hands in order to increase the power and accuracy of the maneuver. When using both hands, the user 104 grasps the rear handle wall 74 with a first hand 106. The rear handle wall 74 and the corresponding handle aperture 18 thus act as a first handle means. The user 104 also grabs the intermediate section 16 with his second hand 108. The intermediate section 16 thus acts as a second handle means.

Figure 10:
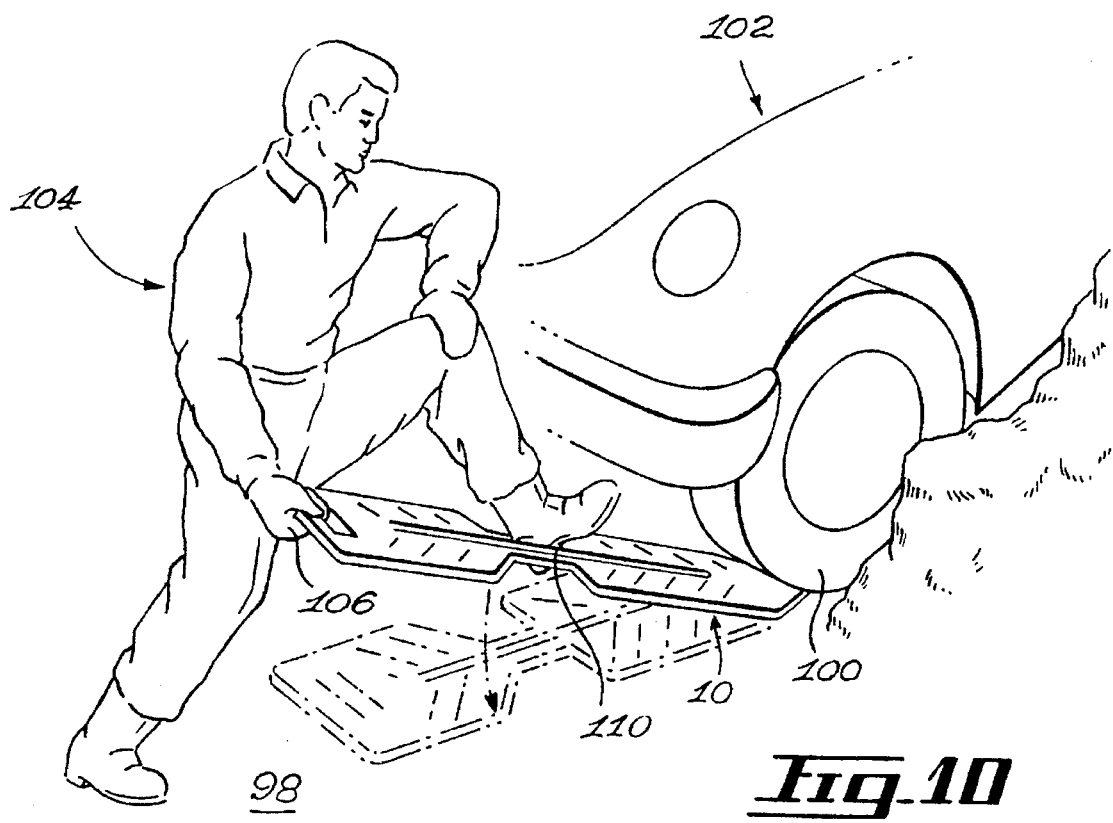
FIG. 10: in a schematic perspective view, illustrates a combined traction-shovel and utility device in accordance with an embodiment of the present invention with its frontal edge being inserted underneath the wheel of a vehicle by a user employing one of his hands and one of his feet.

If yet additional power is needed to wedge the front edge of the flat gripping plate 58 between the tire 100 and the surface 98, the user 104 has the option of using one of his legs to push on the device 10. As illustrated in FIG. 10, the user 104 positions one of his feet 110 against the inwardly oriented front section outer side wall rear segments 32' and pushes forwardly on the latter. When such a foot pushing action is performed, the foot 110 is prevented from slipping sidewardly off the inwardly oriented front section outer side wall rear segments 32' by the relatively elongated rear segment gripping prongs 62.

Once the front edge of the flat gripping plate 58 is wedged between the tire 100 and the surface 98, the bottom surface of the device 10 is rested on the surface 98. The tire 100 can then be driven over the device 10, with the tire 100 contacting the upper surface gripping edges 44 and the lower surface gripping edges 46 contacting the surface 98. The lower surface gripping edges 46 increase the efficiency of the device 10 as a traction mat since they increase the friction coefficient between the device 10 and the surface 98. The lower surface gripping edges 46 thus prevent the device 10 from merely slipping over the surface 98 and being projected away from the vehicle by the spinning of the wheel 100.

Figure 12:
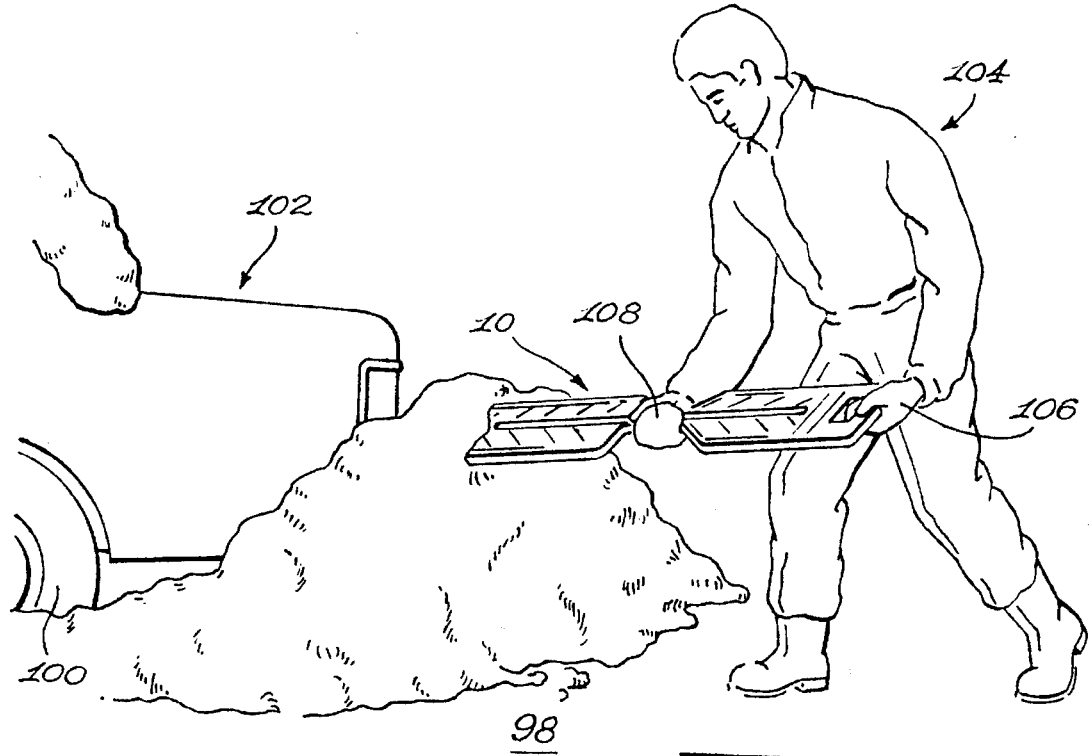
FIG. 12: in a side view, illustrates a combined traction-shovel and utility device in accordance with an embodiment of the present invention being used as a shovel for shoveling snow adjacent a vehicle.

Another main function which the combined traction-shovel and utility device 10 is adapted to perform is that of a shoveling means. When the device 10 is used as a shoveling means, as illustrated in FIG. 12, the user 104 is able to use both hands. As mentioned previously, when using both hands, the user 104 gasps the rear handle wall 74 with a first hand 106, the rear handle wall 74 and the corresponding handle aperture 18 thus acting again as a first handle means. The user 104 also grabs the intermediate section 16 with his second hand, the intermediate section 16 thus acting again as a second handle means.

If particularly heavy material such as wet snow is being shoveled, the user 104 has the option of doubling the structural rigidity of the shovel by snappingly connecting a pair of devices 10 and 10' together. Indeed, the specific design of the device 10 in accordance with an embodiment of the present invention allows the configuration of the bottom surface of one device 10 to fit into the configuration of the top surface of another device 10'.

FIG. 1 illustrates in an exploded view the relative positioning, in register, of a pair of devices 10 and 10' about to be connected together. The outer side walls 32 being slightly outwardly inclined, and the inner side walls 36 being slightly inwardly inclined, the top surface side peripheral edge 38 of the device 10 can be nested in the peripheral recess formed in the lower surface of the device 10' between the outer side walls 32 and the inner side walls 36.

Furthermore, the corrugated pattern of the top surface of the device 10 is complementary to the corrugated pattern of the bottom surface of the device 10'. For example, the intermediate section top wall 34 and the upper portion of the central channel longitudinal side walls 26 of the device 10 can be nested in the recess formed in the lower surface of the device 10' by the central channel longitudinal side walls 26 and the interrupted central channel delimiting walls 42.

Also, the adjacent top surface recesses 52 of the upper surface of the device 10 are adapted to receive the lower surface gripping edges 46 of the device 10'. Reciprocally, the adjacent bottom surface recesses 54 of the bottom surface of the device 10' are adapted to receive the upper surface gripping edges 44 of the device 10.

The devices 10 and 10' are dimensioned so that even when they are put in face to back relationship, the user 104 may use the corresponding superimposed handle apertures 18 and the intermediate sections 16 as first and second handle means.

The specific configuration of the device 10, which allows its back surface to have a corrugated pattern which is complementary to the corrugated pattern of the front surface of another device 10', is not only useful to further increase the structural rigidity of the device 10 or 10'. It also minimizes the storage space needed to store a pair of devices 10 and 10', for example in the trunk of a vehicle.

Figure 11:
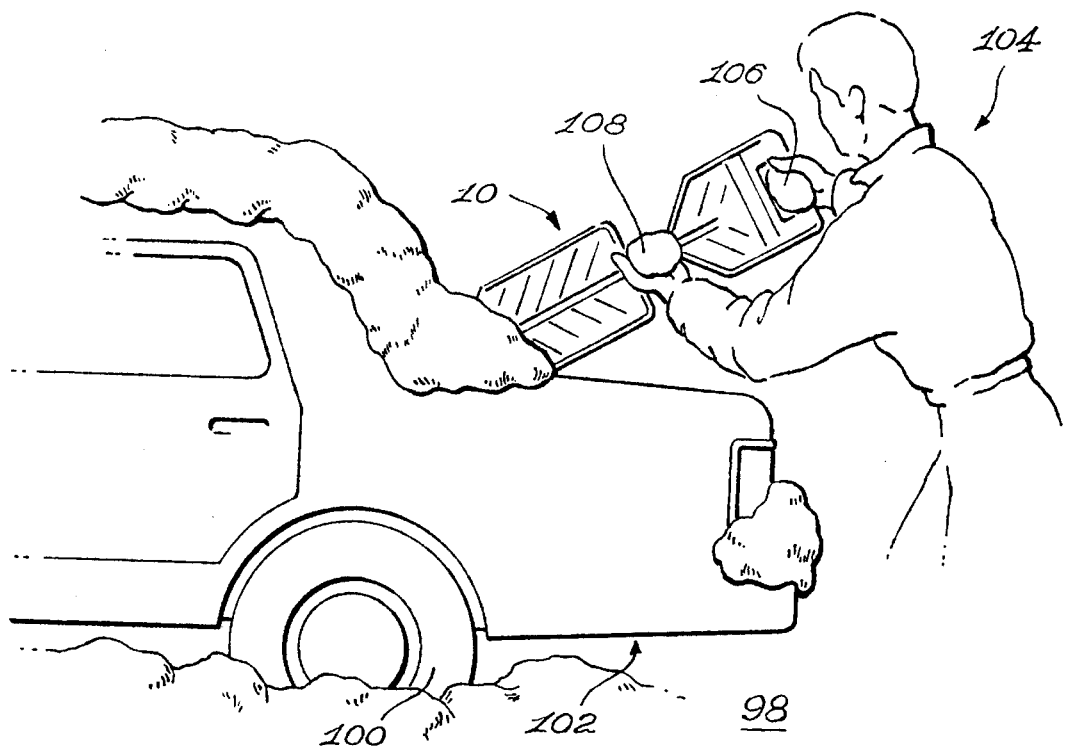
FIG. 11: in a side view, illustrates a combined traction-shovel and utility device in accordance with an embodiment of the present invention being used to clear snow off the trunk of a vehicle.

As illustrated in FIG. 11, the device 10 can also be used to push snow off the hood, trunk or any other part of the vehicle 102. The specific positioning of the first and second handle means, combined with the configuration of the peripheral contour of the device 10, renders the operation ergonomical.

Another one of the functions which the combined traction-shovel and utility device 10 can perform is that of a warning sign for warning oncoming traffic of the presence of a disabled vehicle. If a proper volume of material such as snow is present and if the material has the proper consistency, the device 10 can be used by merely implanting its rearward end into the volume of material and having its frontal section 12 sticking out of the volume of material. If, however, the user 104 wishes to use the device 10 on a relatively hard surface such as pavement, another device 10' can be used as a stabilizing base for supporting the device 10 in a substantially upright position.

When a device 10' is used as a stabilizing base, it is first positioned at an appropriate location with its bottom surface abuttingly resting on the surface 98. The user 104 then positions the rear handle wall 74 of the device 10 into the central channel 20 of the device 10'. The user 104 then inserts the front end of his foot 110 into the handle aperture 18 of the device 10 and exerts a downward pressure with the sole of his foot 110 on the rim handle 70. The pressure on the rim handle 70 releasably and snappingly locks the rear handle wall 74 of the device 10 into the central channel 20 of the device 10', as illustrated more specifically in FIG. 8.

In an alternative embodiment of the present invention, the device 10 can be either covered with reflective or fluorescent tape or formed out of a reflective or fluorescent material which would further increase the efficiency of the device 10 as a road warning sign.

The specific design of the combined traction-shovel and utility device 10 in accordance with an embodiment of the present invention allows it to be formed out of a single piece of injection molded polymeric material.

The embodiments of the invention in which an exclusive privilege or property is claimed are defined as follows:

1. A combined shovel-traction and utility device adapted to be manipulated by a first hand and a second hand of a user said combined shovel-traction and utility device comprising:

a substantially flat and elongated body, said body having
a top surface and a bottom surface, said body having
a first gripping section,
a second gripping section,
an intermediate section located between said first gripping section and said second section,
a corrugated pattern formed on said top surface of said first gripping section and said second gripping section of said body,
a first handle means for allowing said first hand of said user to grasp said first gripping section, said first handle means being formed in said first gripping section,
a second handle means for allowing said second hand of said user to grasp said intermediate section, said second handle means being formed by said intermediate section.
said body having a longitudinal axis dividing said body into a pair of symmetrical halves sections,
said body further comprising a substantially elongated longitudinal channel, said channel extending substantially colinearily with said longitudinal axis, from said first gripping section across said intermediate section and into said second gripping section,
said channel having a substantially "U"-shaped cross-section defining a channel bottom wall and a pair of integrally and substantially perpendicularly extending channel side walls.

2. A combined shovel-traction and utility device as recited in claim 1, wherein said body further comprises a corrugated pattern formed on said bottom surface of said first gripping section and said second gripping section of said body.

3. A combined shovel-traction and utility device as recited in claim 2, wherein said corrugated pattern formed on said top surface of said first gripping section and said second gripping section of said body is substantially complementary to said corrugated pattern formed on said bottom surface of said first gripping section and said second gripping section of said body whereby, when said top surface of said device is put in an abutting relationship with a bottom surface of a similar second combined shovel-traction and utility device, said corrugated pattern formed on said bottom surface of said first gripping section and said second gripping section of said body of said second similar device fits into said corrugated pattern formed on said top surface of said first gripping section and said second gripping section of said combined shovel-traction and utility device.

4. A combined shovel-traction and utility device as recited in claim 2, wherein said body further comprises a set of adjacent oblique gripping walls and wherein said corrugated pattern formed on said top surface comprises a set of top surface angled gripping edges and said corrugated pattern formed on said bottom surface comprises a set of bottom surface angled gripping edges, said top surface gripping edges and said bottom surface gripping edges being formed by said oblique gripping walls.

5. A combined shovel-traction and utility device as recited in claim 1, wherein said second gripping section has a second gripping section front end and a second gripping section rear end, said second gripping section also has a pair of second gripping section longitudinal side walls and a second gripping section rear wall, said second gripping section rear wall being positioned at said rear end of said second gripping section, said second gripping section rear wall being substantially perpendicular to said second gripping section side walls, said second gripping section rear wall extending integrally and substantially perpendicularly into said intermediate section.

6. A combined shovel-traction and utility device as recited in claim 5, wherein said second gripping section has a substantially flat plate projecting integrally and substantially frontwardly from said second gripping section front end.

7. A combined shovel-traction and utility device as recited in claim 1, wherein said first gripping section has a first gripping section rear end and wherein said first handle means comprises a handle aperture extending through said first gripping section and a handle rear wall positioned adjacent said handle aperture, said handle aperture and said handle rear wall being positioned adjacent said first gripping section rear end.

8. A combined shovel-traction and utility device as recited in claim 1, wherein said device is adapted to be used as a traction mat for a tire of a conventional vehicle and wherein said first gripping section and said second gripping section have a width corresponding substantially to the width of said tire of said conventional vehicle and wherein said intermediate section has a width allowing said second hand of said user to grasp said intermediate section.

9. A combined shovel-traction and utility device, said device comprising:
a substantially flat and elongated body, said body having
a top surface and a bottom surface, said body having
a first gripping section,
a second gripping section,
an intermediate section located between said first gripping section and said second gripping section,
said first gripping section and said second gripping section both having a pair of opposed top and bottom surfaces, each one of said top and bottom surfaces bearing a substantially corrugated pattern,
an elongated, open-top, substantially "U"-shaped central channel extends from said first gripping section across said intermediate section, into said second gripping section, said central channel has a central channel bottom wall, a pair of central channel longitudinal walls extending integrally and substantially upwardly from said central channel bottom wall and a pair of central channel transversal walls joining said central channel longitudinal walls at opposite longitudinal ends of said central channel,
a pair of peripheral outer side walls extend along both longitudinal sides of said body, said peripheral outer side walls project substantially perpendicularly to said top and bottom surfaces,
an intermediate section segment of said outer side walls extends integrally into a pair of intermediate section top walls,
each intermediate section top wall merges into an upper edge of said central channel longitudinal walls, said intermediate section having a substantially elongated configuration.

\* \* \* \* \*